United States Patent
Sparrow et al.

(10) Patent No.: US 8,959,092 B2
(45) Date of Patent: Feb. 17, 2015

(54) PROVIDING STREAMS OF FILTERED PHOTOGRAPHS FOR USER CONSUMPTION

(71) Applicant: Google Inc., Mountain View, CA (US)

(72) Inventors: Isaac Sparrow, Scotts Valley, CA (US); Anthony Howard Payne, Northridge, CA (US); Kevin Courtney Smilak, Torrance, CA (US); Simon Han, Los Angeles, CA (US); Amir Fish, Palo Alto, CA (US); David M. Cohen, Mountain View, CA (US); Matthew Stephen Steiner, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 96 days.

(21) Appl. No.: 13/727,501

(22) Filed: Dec. 26, 2012

(65) Prior Publication Data

US 2014/0006420 A1 Jan. 2, 2014

Related U.S. Application Data

(60) Provisional application No. 61/665,240, filed on Jun. 27, 2012.

(51) Int. Cl.
 *G06F 17/00* (2006.01)
 *G06F 17/30* (2006.01)
(52) U.S. Cl.
 CPC .... *G06F 17/30244* (2013.01); *G06F 17/30029* (2013.01)
 USPC ........... 707/749; 707/722; 707/736; 707/758; 706/12; 706/14; 706/45; 709/204; 705/14.53
(58) Field of Classification Search
 None
 See application file for complete search history.

(56) References Cited

U.S. PATENT DOCUMENTS

| | | | |
|---|---|---|---|
| 7,382,903 B2 | 6/2008 | Ray | |
| 8,818,978 B2* | 8/2014 | Wu et al. | 707/706 |
| 2007/0236505 A1* | 10/2007 | Jung et al. | 345/589 |
| 2008/0154931 A1 | 6/2008 | Jacobs et al. | |
| 2009/0210512 A1* | 8/2009 | Steinhart et al. | 709/218 |
| 2010/0042609 A1* | 2/2010 | Wu et al. | 707/5 |
| 2011/0107238 A1* | 5/2011 | Liu et al. | 715/756 |
| 2011/0212717 A1 | 9/2011 | Rhoads et al. | |
| 2011/0307478 A1* | 12/2011 | Pinckney et al. | 707/724 |
| 2012/0084655 A1* | 4/2012 | Gallagher et al. | 715/725 |
| 2013/0114864 A1* | 5/2013 | Garcia et al. | 382/118 |
| 2013/0124508 A1* | 5/2013 | Paris et al. | 707/723 |
| 2014/0143258 A1* | 5/2014 | Kao et al. | 707/748 |

OTHER PUBLICATIONS

International Search Report and Written Opinion for PCT/US2013/047583, mailed May 6, 2014, 12 pages.

* cited by examiner

*Primary Examiner* — Hung Le
(74) *Attorney, Agent, or Firm* — Patent Law Works LLP (57) ABSTRACT

The present disclosure comprises systems and methods for providing a stream of only those photographs (including those inter-mixed with videos and hybrid types (animated gifs, animated photo bursts, etc.)) that may be of interest to particular users in a social network based on consideration of user social graphs and other external signals generated for the photographs based on predefined criteria to determine user interest levels. The systems and methods obtain photographs, retrieve social graphs for particular users, evaluate and filter photographs, rank them, and limit the number of photographs provided for viewing from a single source. Accordingly, only photographs that are determined to be most interesting to particular users are provided for display to them.

18 Claims, 8 Drawing Sheets

Example Assignment of Weights for Signals

602

| Signal | Weight |
|---|---|
| How recently was the photograph taken? | 5 |
| The user's affinity to people tagged in the photograph | 10 |
| The user's affinity to the user sharing the photograph | 9 |
| The location where the photograph was taken | 3 |
| The number of comments made on the photograph | 7 |
| The number of users who like the photograph | 6 |
| How recently was the photograph commented on? | 5 |
| How recently was the photograph liked? | 3 |
| A level of aesthetic of the photograph | 4 |

PROVIDING STREAMS OF FILTERED PHOTOGRAPHS FOR USER CONSUMPTION

CROSS REFERENCE TO RELATED APPLICATIONS

The present application claims the benefit of priority under 35 U.S.C. §119(e) of U.S. Provisional Application No. 61/665,240 entitled "Providing Streams of Filtered Photographs for User Consumption," filed on Jun. 27, 2012, by Isaac Sparrow, Anthony Howard Payne, Kevin Smilak, Simon Han, Amir Fish, Dave Cohen, and Matthew Steiner. The entire contents of the provisional application are incorporated by reference herein.

BACKGROUND

The present disclosure relates to streams of photographs (or "photos") shared or otherwise accessed by users in an online service or community, for example, in a social network. In particular, the present disclosure relates to providing photograph streams (including those inter-mixed with videos and hybrid types (animated gifs, animated photo bursts, etc.)) to particular users within a social network that are filtered based at least in part on user social graphs or external signals generated with respect to individual photographs.

A social network or other online community provides an online platform that allows users to share ideas, activities, events, or interests within individual networks created by users including those with whom users may share affinity. In social networks, photographs are among the most engaging and long-lasting items that are shared by users. For example, a particular user's interest in postings by his or her friends on what they may have eaten for dinner is unlikely to last as long as an interest in photographs, which serve as memories, for example, taken at a birthday party. However, there is a continuous flow of photographs in social networks, many of which are of little interest to users; the overwhelming numbers making it difficult for users to view them all, much less appreciate a photograph of special interest that is easily lost in this continuous flow. Therefore, it would be beneficial to provide individual users with only those photographs that feature others in their social graph or are otherwise of special interest to them.

SUMMARY

The present disclosure overcomes the deficiencies and limitations of the prior art by providing technologies comprising systems and methods for providing a stream of only those photographs (including those inter-mixed with videos or hybrid types (animated gifs, animated photo bursts, etc.)) that are determined to be of "special" interest to particular users in a social network. Photographs from a continuous stream (or "photo stream") are determined to be of interest to particular users and are selected for viewing based on a particular user's social graph including user affinity determinations or external signals that are generated based on predetermined criteria. Specifically, this technology comprises systems and methods that retrieve the photograph stream for a particular user, retrieve the social graph of that user, determine the relevant signals about the photographs, assign weights to the signals of the photographs, limit the number of the photographs from a single source, rank photographs based on the weighted signals, filter photographs based on the weighted signals, and present the most interesting photographs to the user.

In some embodiments, the present technology provides a computer-implemented method for providing a stream of photographs for viewing by a particular user connected to other users in a social network, wherein the method comprises 1) obtaining, using one or more computing devices, one or more photographs from one or more sources for viewing by the particular user; 2) determining, using the one or more computing devices, one or more relevant signals for each of the one or more photographs; 3) generating external signals, using the one or more computing devices, to designate the one or more photographs based at least in part on considering criteria predefined for the particular user; 4) filtering, using the one or more computing devices, a select subset of the one or more photographs based at least in part on considering the external signals with respect to each of the one or more photographs; and 5) generating, using the one or more computing devices, a stream of the select subset of the one or more photographs for viewing by the particular user.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

In some examples, the specification describes systems and methods for providing a stream for viewing of photographs (including those inter-mixed with videos or hybrid types (animated gifs, animated photo bursts, etc.)) by users of an online community or service, for example, users connected in a social network. It should recognized that any reference to photographs in this description includes photographs that are inter-mixed with videos or hybrid types, including animated gifs, animated photo bursts etc. In the following description, for purposes of explanation, numerous specific details are indicated in order to provide a thorough understanding of the technology described. It should be apparent, however, to one skilled in the art, that this technology can be practiced without these specific details. In other instances, structures and devices are shown in block diagram form in order to avoid obscuring the technology. For example, the present technology is described with some embodiments below with reference to user interfaces and particular hardware. However, the present technology applies to any type of computing device that can receive data and commands, and any devices providing services. Moreover, the present technology is described below primarily in the context of providing select photographs to particular users rather than a continuous stream of photographs of little or no interest to the particular; however, those skilled in the art should understand that the present technology can be used for other applications beyond filtering of photographs based on a social graph or generating external signals from certain criteria that is predetermined to filter photographs of interest.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory of either one or more computing devices. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment containing both hardware and software components. In some embodiments, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

Figure 1:
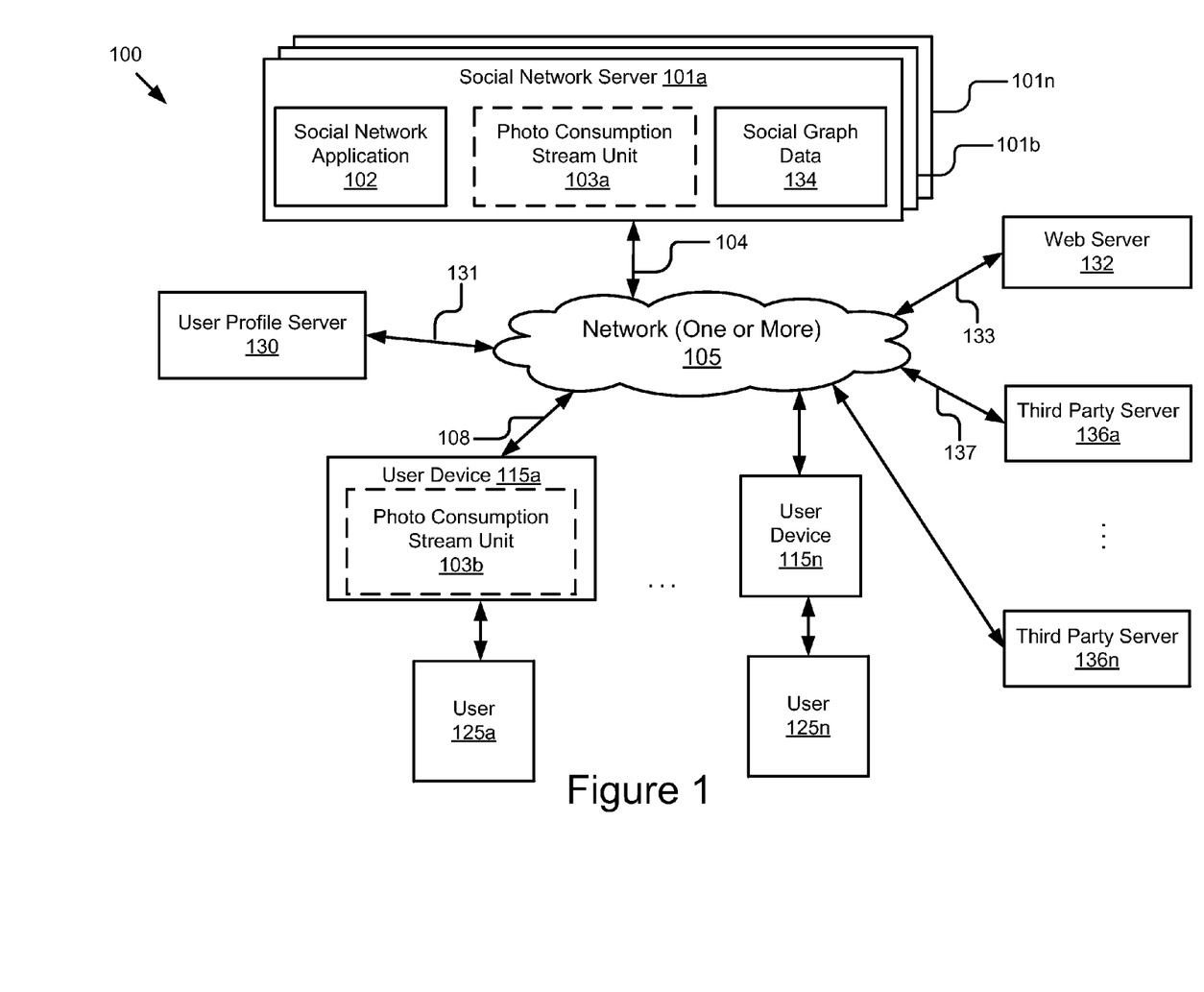
FIG. 1 is a high-level block diagram illustrating some embodiments of a system for providing a photograph stream (including those inter-mixed with videos or hybrid types (animated gifs, animated photo bursts, etc.)) for viewing of select photographs based on a particular user's social graph.

FIG. 1 is a high-level block diagram illustrating some embodiments of a system indicated generally by reference numeral 100 for providing a photograph stream (including those inter-mixed with videos or hybrid types (animated gifs, animated photo bursts, etc.)) for users of an online service or community, for example, a social network, to view "select" photographs filtered based on a particular user's social graph or other external signals to designate individual photographs of varying levels of interest. The external signals may be generated based on applying predefined criteria to filter photographs that are of special interest to a particular user. The system 100 includes one or more social network servers 101*a*, 101*b*, through 101*n*, that may be accessed via user devices 115*a* through 115*n*, which are used by users 125*a* through 125*n*, to connect to any one of the social network servers 101*a*, 101*b*, through 101*n*. These entities are communicatively coupled via a network 105 to facilitate exchange of information between the user devices 105*a-n* and the social network servers, 101a-n. Although only two user devices 115a through 115n are illustrated, persons of ordinary skill in the art should recognize that any numbers of user devices 115n may be used by any number of users 125n.

Furthermore, while only one network 105 is illustrated as coupled to the user devices 115a through 115n, the social network servers, 101a-101n, the user profile server 130, the web server 132, and one or more third party servers 136a-136n, in practice, any number of networks 105 may be connected to these entities.

In some embodiments, the social network server 101a is coupled to the network 105 via a signal line 104. The social network server 101a includes a social network application 102, which comprises the software routines and instructions to operate the social network server 101a and its functions and operations. Although only one social network server 101a is described here, persons of ordinary skill in the art should recognize that multiple servers may be present, as illustrated by the social network servers 101b through 101n, each with functionality similar to the social network server 101a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system 100, including explicitly-defined relationships and relationships implied by social connections with other online users, where the relationships form a social graph 134.

The term "social graph" as used here encompasses its plain and ordinary meaning including, but not limited to, a set of online relationships between users, such as provided by one or more social networking systems, such as the social network system 100, including explicitly-defined relationships and relationships implied by social connections with other online users, where the relationships form a social graph. In some examples, the social graph 134 may reflect a mapping of these users and how they are related.

It should be understood that social network server 101a and the social network software/application 102 are representative of a single social network. Each of the plurality of social networks 101a, 101b through 101n, is coupled to the network 105, each having its own server, application, and social graph. For example, a first social network hosted on a social network server may be directed to business networking, a second directed to or centered on academics, a third directed to local business, a fourth directed to dating, and yet others directed to other general interests or perhaps a specific focus.

A user profile server 130 is illustrated as a stand-alone server in FIG. 1. In other embodiments of the system 100, all or part of the user profile server 130 may be part of the social network server 101a. The user profile server 130 is connected to the network 105 via a line 131. The user profile server 130 has profiles for all the users that belong to a social network. The third party server 136a is connected to the network 105, via signal line 137. A web server 132 is connected, via line 133, to the network 105.

The social network server 101a includes a photo consumption unit 103a, to which user devices 115a through 115n are coupled via the network 105. In particular, the user device 115a is coupled via line 108 to the network 105. The user 125a via the user device 115a may access the social network server 101a to communicate with other users with whom he or she shares affinity, for example, to post or view updates including written comments or photographs. In these communications, the user 125a is presented with a stream of photographs provided by others. The photo consumption unit 103a serves to filter only those photographs or photos of interest to the user device 115a. Persons of ordinary skill in the art should recognize that the photo consumption stream unit 103a may be stored in any combination, in the social network server 101a (illustrated by reference numeral 103a), or in the user device 115a (illustrated by reference numeral 103b), or in all of them as illustrated in FIG. 1, or in only one of the devices or servers illustrated.

The photo consumption stream unit 103a is a system for generating a photo stream for a particular user in a social network to view photographs based on the user's social graph and other external signals generated for the photographs. As one example, the photo consumption stream unit 103a prevents the photograph stream from being dominated by a single source by limiting the number of photographs from that single source. The stream is presented to the user 125a in a visually interesting and non-regular grid pattern. Thus, the photo consumption stream unit 103a may be a web-based application, composed of many independent parts loosely coupled in a distributed architecture, to provide photograph streams in a social network that are tailored to user interests and priorities.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 is of conventional type, wired or wireless, and may have any number of configurations such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105 may be a peer-to-peer network. The network 105 may also be coupled to or include portions of one or more telecommunications networks for sending data in a variety of different communication protocols.

In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network server 101a, the user profile server 130, the web server 132, and the third party server 136a are hardware servers including a processor, memory, and network communication capabilities. One or more of the users 125a through 125n access any of the servers 101a through 101n, via browsers in their user devices and via the web server 132.

Figure 2A:
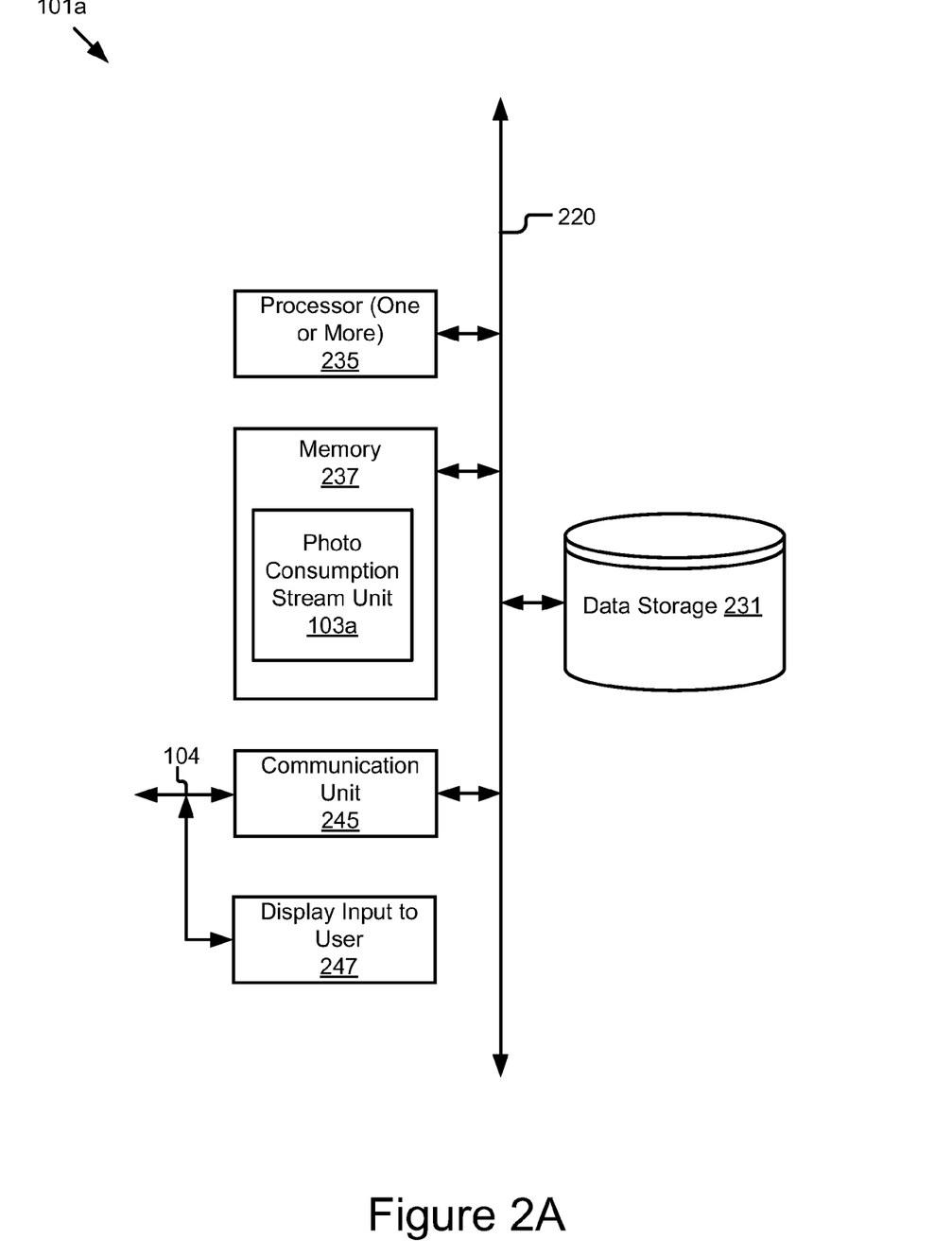
FIG. 2A is a block diagram illustrating some embodiments of a social network server shown in FIG. 1, including its hardware components.

FIG. 2A is the block diagram illustrating some embodiments of the hardware architecture of the social network server 101a. In FIG. 2A, like reference numerals have been used to reference like components with the same or similar functionality that has been described above with reference to FIG. 1. Since those components have been described above that description is not repeated here. The social network server 101a generally comprises one or more processors, although only one processor 235 is illustrated in FIG. 2A, a memory 237, data storage 231, a communication unit 245, and a display input to user 247. The processor 235, the memory 237, the data storage 231, and the communication unit 245 are communicatively coupled over the system bus 220. The display input to user 247 is communicatively coupled to the communication unit 245 to display written content or photographs to the user devices, for example user devices 115*a* through 115*n* over the network 105. In the illustrated embodiment, the photo consumption stream unit 103*a* resides within the social network server 101*a*.

The processor 235 processes data signals and program instruction received from the memory 237 and the data storage 231. The processor 235 may comprise various computing architectures including a complex instruction set computer (CISC) architecture, a reduced instruction set computer (RISC) architecture, or an architecture implementing a combination of instruction sets.

The memory 237 may be a non-transitory storage medium. The memory 237 stores the instructions and/or data for the photo consumption stream unit, which may be executed by the processor 235. In one embodiment, the instructions and/or data stored on the memory 237 comprises code for performing any and/or all of the techniques described herein. The memory 237 may be a dynamic random access memory (DRAM) device, a static random access memory (SRAM) device, flash memory or some other memory device known in the art.

The data storage 231 stores the data and program instructions that may be executed by the processor 235. The data storage 231 includes a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

The communication unit 245 facilitates the communication between the user device 115*a* and the server 101*a* over the network 105. A user 125*a*, via the user device 115*a*, posts a message to the sever 101*a* and receives information from the server 101*a* via communication unit 245.

The display input to user 247 displays the information received from the server 101*a* to users. In one embodiment, the display input to user 247 displays one or more photographs in photograph streams for viewing by users. These photograph streams are generated by the photo consumption stream unit 103*a* that is also coupled to the system bus 220.

Figure 2B:
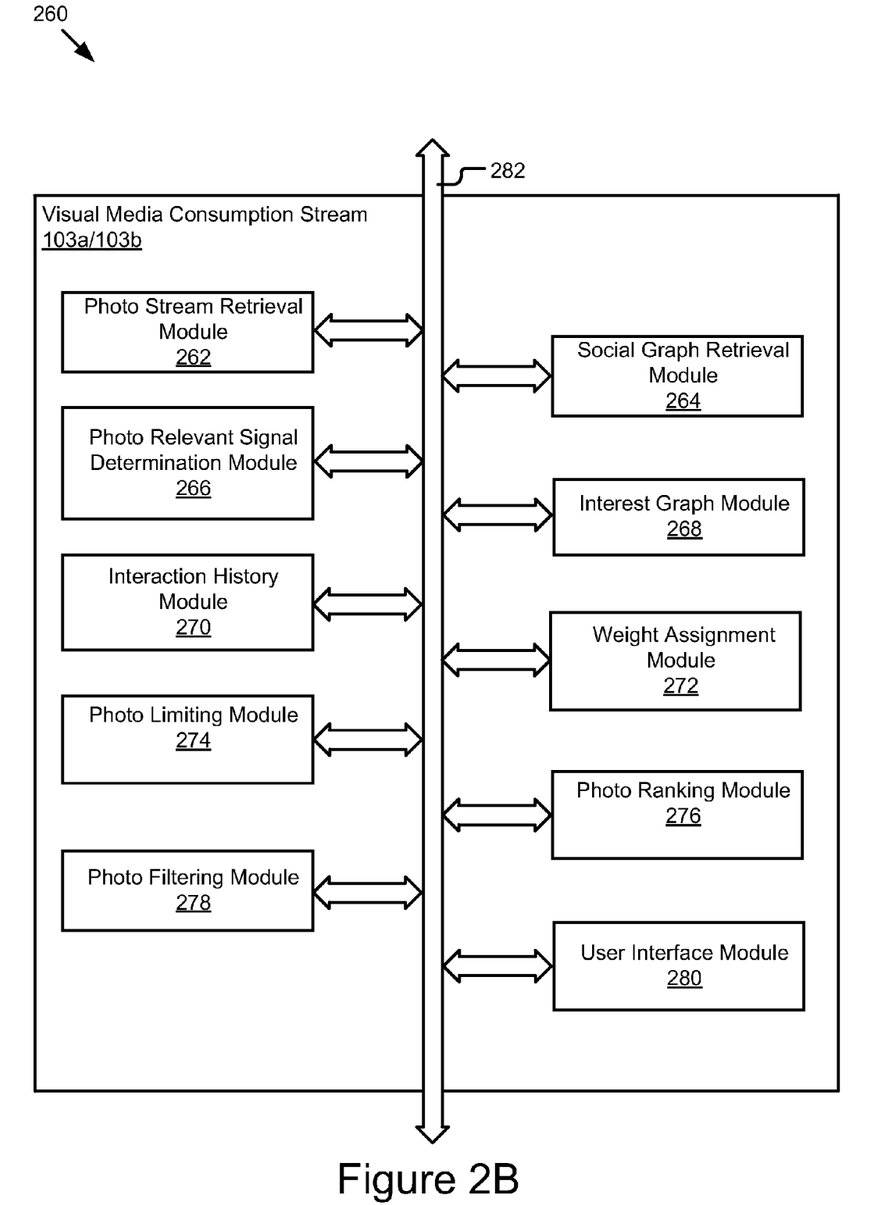
FIG. 2B is a block diagram illustrating some embodiments of the photo consumption stream unit and its software components.

FIG. 2B is a block diagram illustrating the components within the photo consumption stream unit 103*a* (residing in the social network server 101*a*) or photo consumption stream unit 103*b* (components that may reside in a user device 115*a*). The photo consumption stream unit 103*a*/103*b* comprises various modules including a photograph stream retrieval module 262, a social graph retrieval module 264, a relevant photograph determination and external signal generation module 266, an interest graph module 268, an interaction module 270, a weight assignment module 272, a photograph limiting module 274, a photograph ranking module 276, a photograph filtering module 278, and a user interface module 280, all of which are communicatively coupled to the software communication mechanism 282.

The photo consumption stream unit 103*a*/103*b* includes one or more applications or engines that are configured to communicate over the software communication mechanism 282. Software communication mechanism 282 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication may be implemented on any underlying hardware, such as a network, the Internet, a system bus 220, a combination thereof, etc.

The photograph stream retrieval module 262 is configured to retrieve a photograph stream from a plurality of sources within a user's social network and sends the photograph stream to the relevant photograph determination and external signal determination module 266. The social graph retrieval module 264 retrieves a social graph for a particular user. In some embodiments, the social graph for each particular user represents a set of online relationships that the particular user has with other users. These relationships may be based on consideration of different criteria, for example, based on friendship, family connections, shared schooling, business associations, sharing common interests, and so on. In a social network, users create their own networks with others with whom they may wish to communicate. Communications are channeled to those within a user's social network.

The relevant photograph determination and external signal generation module 266 is configured to determine "relevant" factors for individual photographs obtained from the photograph stream retrieval module 262. The relevant factors are used to generate externals signals for those individual photographs. In some embodiments, the relevant signals for the photographs may reflect how recently a particular photograph was taken. The relevant signals may also reflect any one or more of other factors, for example, the user's affinity to the people tagged in the particular photograph, the user's affinity to the user sharing the photograph, and whether there is a face (or faces) in the photograph. In other embodiments, the relevant signals may reflect the location where the photograph was taken. Further, the relevant signals may reflect one or more of other factors, for example, the number of comments made by others on the photograph, the number of users who endorse the photograph, how recently the photograph was commented on, how recently the photograph was endorsed, and the aesthetic level of the photograph.

The interest graph module 268 creates an interest graph for the user based on user activity within a social network. In some embodiments, relevant signals can include the user's interest graph (which may contribute photographs outside the user's direct and/or indirect social network) as well as signals derived from the users viewing and/or interaction history.

The interaction history module 280 determines a user's interaction history within the social network. In some embodiments, relevant signals can include the users viewing and/or interaction history. Viewing history and/or interaction history within the social network can indicate interest in a particular photographer, subject (e.g., butterflies, mountains, etc.), or photograph style. The viewing and/or interaction history may be determined by the user interacting with a photographer's work (e.g., by commenting, sharing, approving, etc.), belonging to a group on a particular subject (e.g., about butterflies), etc. In other embodiments, the interests may also be explicitly declared (e.g., listing mountains, butterflies, surfing, etc. as interests).

The weight assignment module 272 is configured to assign weights to signals generated from social graph data 134. As one example, people typically care most about their family members or friends; therefore, they are most interested in photographs in which their family members are tagged. Accordingly, based on a particular user's affinity to people tagged in a photograph that particular photograph is assigned a "high" weight and external signals are generated to reflect the weighting for that photograph. As another example, a user may not care about how recently a particular photograph was endorsed by other users. Accordingly, that particular photograph is assigned a low weight and an external signal reflecting that "low" weight is generated.

The photograph limiting module 274 is configured to limit the number of photographs from a given album, source, or user to prevent the stream from being dominated by a single source. The photograph ranking module 276 ranks a particular photograph based on the weights assigned to the photograph. The photograph filtering module 278 is configured to filter out the photographs with low ranking in order to present only the most interesting photographs to a user.

The user interface module 280 provides for display to users only the most interesting photographs to them. In some embodiments, the photographs are displayed in a visually interesting and non-regular grid pattern.

Figure 3:
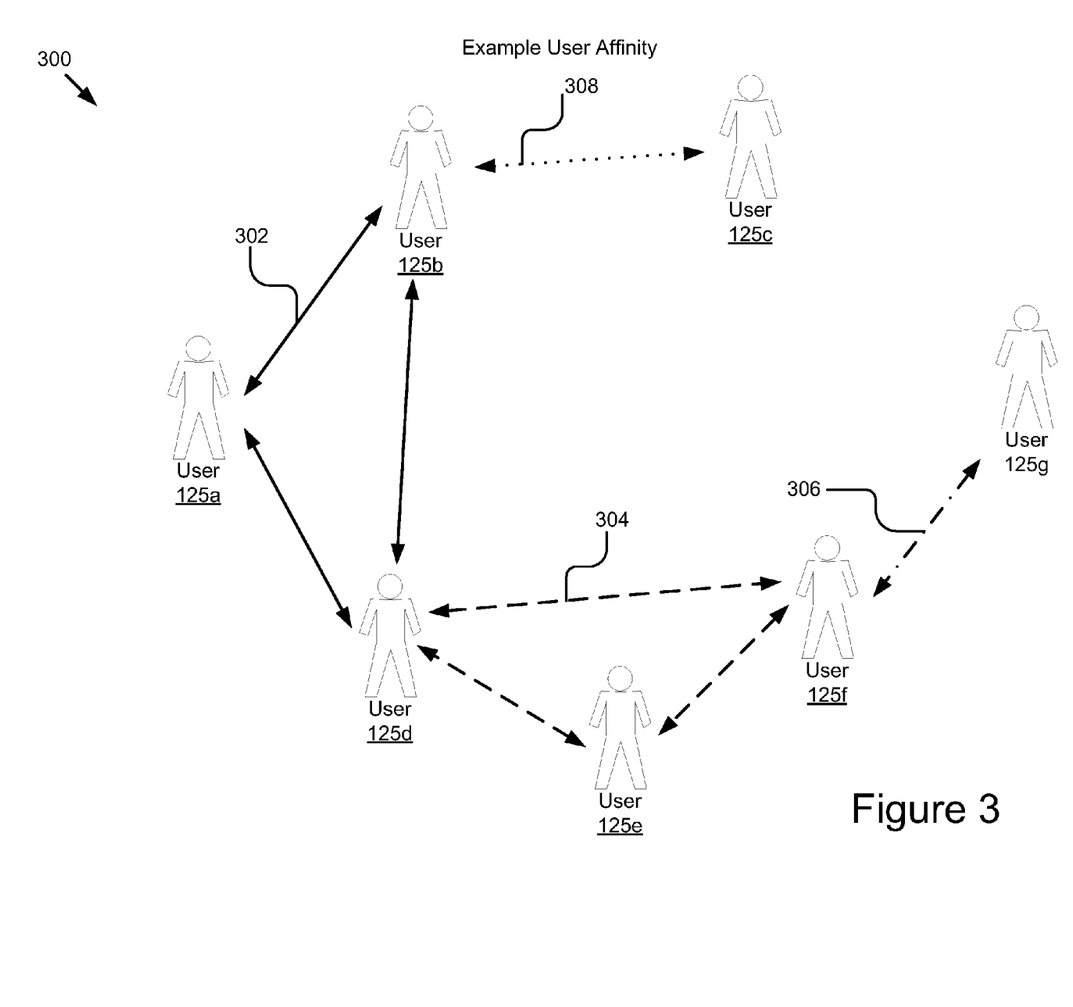
FIG. 3 is a graphical representation illustrating an example of user affinity illustrated by a social graph for the particular user.

Referring now to FIG. 3, an example scenario illustrating user affinity is illustrated, as indicated generally by reference numeral 300. The illustrated example indicates users 125a-125g, showing that they share four different types of relationships, for example, resulting from family connections, friendships, being coworkers, or mere acquaintances. The relationship shared by user 125a, the user 125b, and the user 125d, is based on family connections, therefore, a solid and close relationship, which is illustrated by the solid lines indicated by reference numeral 302. The relationship shared by user 125d, user 125e, and user 125f is based on friendship, therefore, reflecting another close relationship, as illustrated by the dashed lines indicated by reference numeral 304. The relationship between user 125f and the user 125g results from their being coworkers, which is illustrated by the dotted and dashed line, indicated by reference numeral 306. The relationship between the user 125b and user 125c is more distant as they are mere acquaintances, which is illustrated by the dotted line 308.

Figure 4:
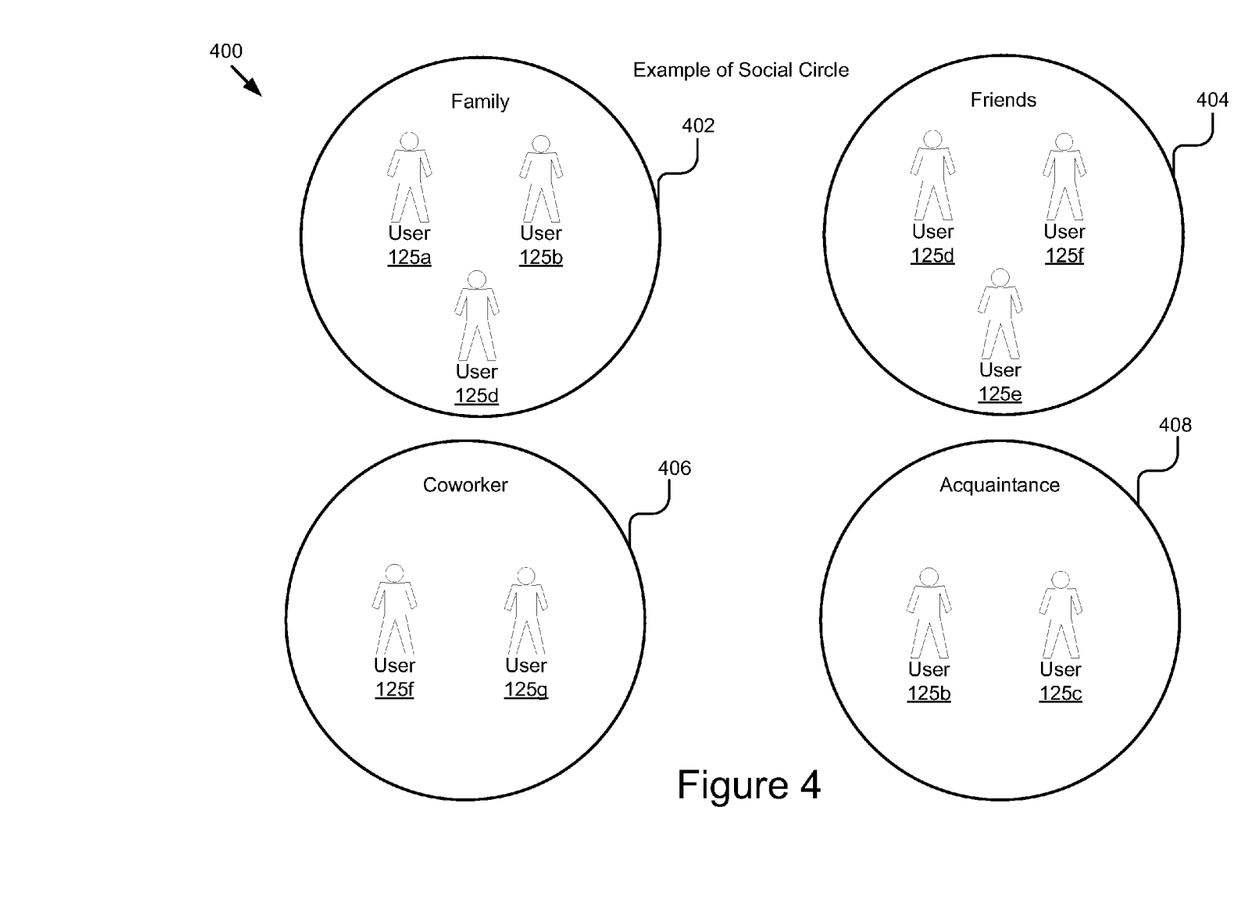
FIG. 4 is a graphical representation illustrating an example of social groups within a particular user's social graph.

Referring now to FIG. 4, a graphical representation illustrates examples of some social groups of a particular user, indicated generally by reference numeral 400. The social groups are networks created by users, by either inviting others to join their groups or responding to invitations by others. The social groups include groups of family members, friends, coworkers, and acquaintances. As one example that is illustrated in FIG. 4, the user 125a, the user 125b, and the user 125d belong to a family and form a group 402. As another example, the user 125d, the user 125f, and the user 125e are friends and form a group 404. The user 125b and the user 125c are acquaintances and form a group 406. The user 125f and the user 125g are coworkers in the same company and form a group 408. The user 125d belongs to both the group 402 of a particular family and the group 404 of a set of friends, as is illustrated by the intersection of the two, with the user 125d indicated within. Similarly, the user 125f belongs to the group 404 of the set of friends illustrated and the group 408 of coworkers. This is illustrated by the intersection of the two groups 404 and 408, with the user 125f within it. Again, the user 125b falls within an intersection of groups 402 and 406, indicating that he or she belongs to both the group of family members and the group of acquaintances.

Figure 5:
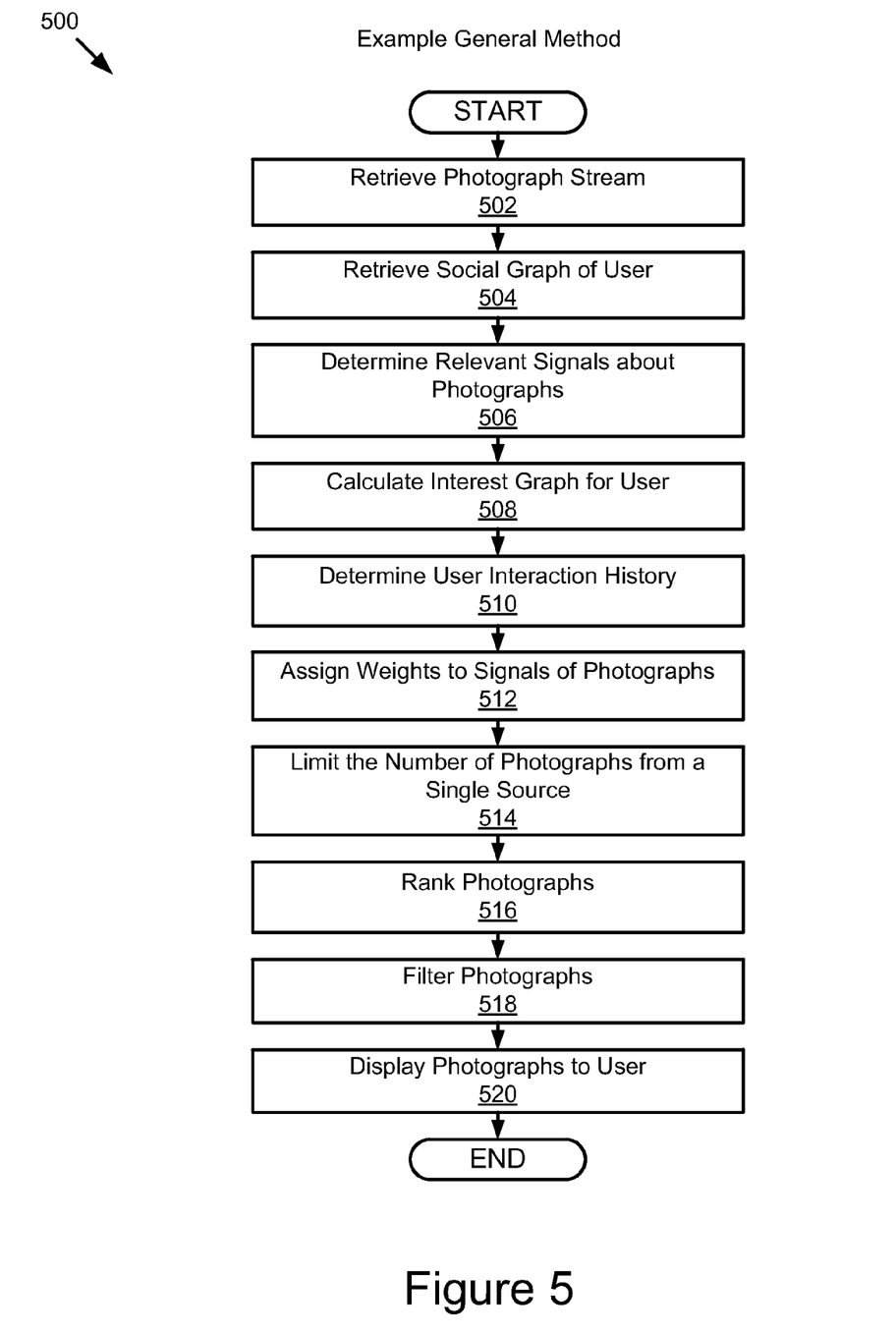
FIG. 5 is a flow chart illustrating an example general method for providing a photograph stream for users in a social network based on a user social graph and other external signals generated with respect to individual photographs.

FIG. 5 is a flow chart illustrating an example general method indicated by reference numeral 500 for providing a photograph stream to users based on a particular user's social graph and other external signals generated for photographs. The external signals are generated based on predefined criteria to analyze the significance or interest in individual photographs.

The method starts and proceeds to block 502, which includes one or more operations to retrieve a photo stream. In some embodiments, the photograph stream retrieval module 262 (FIG. 2B) retrieves the photo stream from a particular user's social network (one or more sources). The method proceeds to the next block 504 (including one or more operations), at which stage, the social graph retrieval module 264 (FIG. 2B) retrieves the social graph data 134 (FIG. 1) for a particular user. The method proceeds to the block 506, at which stage, based on the social graphs for particular users and other criteria, relevant information or signals are analyzed for the photographs that are retrieved. In some embodiments of the method, the relevant photograph determination and external signal generation module 266 (FIG. 2B, also referred to as the relevant photograph determination module) first determines relevant signals for particular photographs. As one example, the relevant photograph determination module 266 may determine the relationship between people who are tagged in a particular photograph and the user. As another example, the relevant photograph determination module 266 may determine the number of comments made on a particular photograph and the number of people who endorse the photograph.

The method proceeds to the next block 508 (including one or more operations), at which stage, the interest graph module 268 (FIG. 2B) calculates an interest graph for the user. As one example, the interest graph module 268 calculates that a user has an interest in photographs of butterflies based on a user commenting on one or more photographs of butterflies. The method proceeds to the next block 510, at which stage, the interaction history module 270 (FIG. 2B) determines a user's interaction history. For example, the interaction history module 270 determines that a user interacts frequently with photographs of butterflies.

The method proceeds to the next block 512 (including one or more operations), at which stage, the weight assignment module 272 (FIG. 2B) assigns weights to external signals that are generated for individual photographs based on analysis of predefined criteria for evaluating if a particular photograph may be of interest to a particular user. As one example, the weight assignment module 272 assigns a "high" weight to a photograph in which a user's family member is tagged or which is shared among other family members. The method proceeds to the next block 514, at which stage, the photograph limiting module 274 (FIG. 2B) limits the number of the photographs from a single source. For example, the photograph limiting module 279 limits the number of the photographs from a given album or user to prevent the stream from being dominated by a single source.

The method proceeds to the block 516, at which stage, the photograph ranking module 276 (FIG. 2B) ranks the photographs based on the weighted signals of the photographs. The method proceeds to the block 518, at which stage, the photograph filtering module 278 (FIG. 2B) filters the photographs that have been assigned a low rank. The method proceeds to the block 520, at which stage, the user interface module 280 (FIG. 2B) displays the most interesting photographs to the user.

Figure 6:
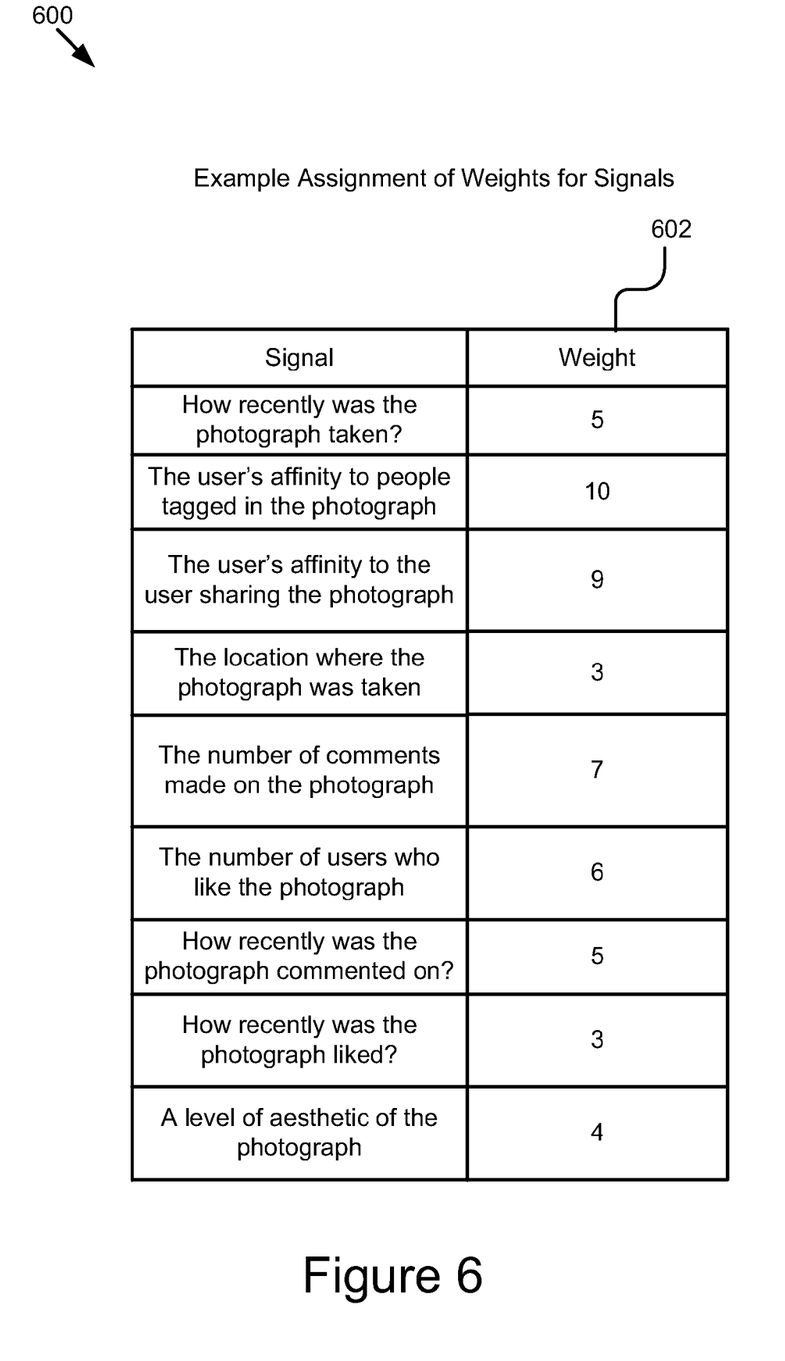
FIG. 6 is a table illustrating an example for assigning weights to photographs based on generating external signals due to certain predefined criteria.

Referring now to FIG. 6, examples of the predefined criteria that may be used to assign varying weights is illustrated in a table indicated by reference numeral 602. It should be recognized that the predefined criteria indicated here are merely examples; other criteria may be substituted or added to evaluate photographs of interest to users. In addition, the criteria may be uniformly applied for all users of the social network or may be varied by categories or status levels of users. As one example, because a user generally cares most about those who are closest to him or her, affinity signals designating close relationships may designate those who are most dear and important to the user. In this example, the affinity signals would represent this criteria, and photographs relating to relationships that represent this affinity may be tagged as "of special interest" to the particular user. As illustrated in the table, if based on a user's social graph, an affinity is determined between the particular user to whom a specific photograph is sent and other users in the photograph, it is likely that the particular user may want to see this particular photograph. Therefore, this photograph may be accorded a weight of "10." As another example, if based on a particular user's social graph, it is determined that the particular user with whom a photograph is shared has an affinity with the user sharing the photograph, that particular photograph is accorded a weight of "9." As yet another example, if it is determined that there is a face or a plurality of faces in a particular photograph; it is likely to be of more interest than a photograph of an inanimate object. This particular photograph would be accorded a weight of "8." Any of these weights, that is "10," "9," or "8" may be considered as "high."

As other examples illustrated in the table, the user may have less interest in the location where a particular photograph was taken and on how recently the particular photograph was endorsed. Therefore, these two signals are assigned the lowest weight in the evaluation scheme, a weight of "3," as shown in the table. As yet another example, the number of comments made with respect to a particular photograph and the number of users who endorse a particular photograph are also two important signals that may be of interest to a particular user. These two signals are therefore, accorded high weights, "7" and "6," respectively, as shown in the table.

Figure 7:
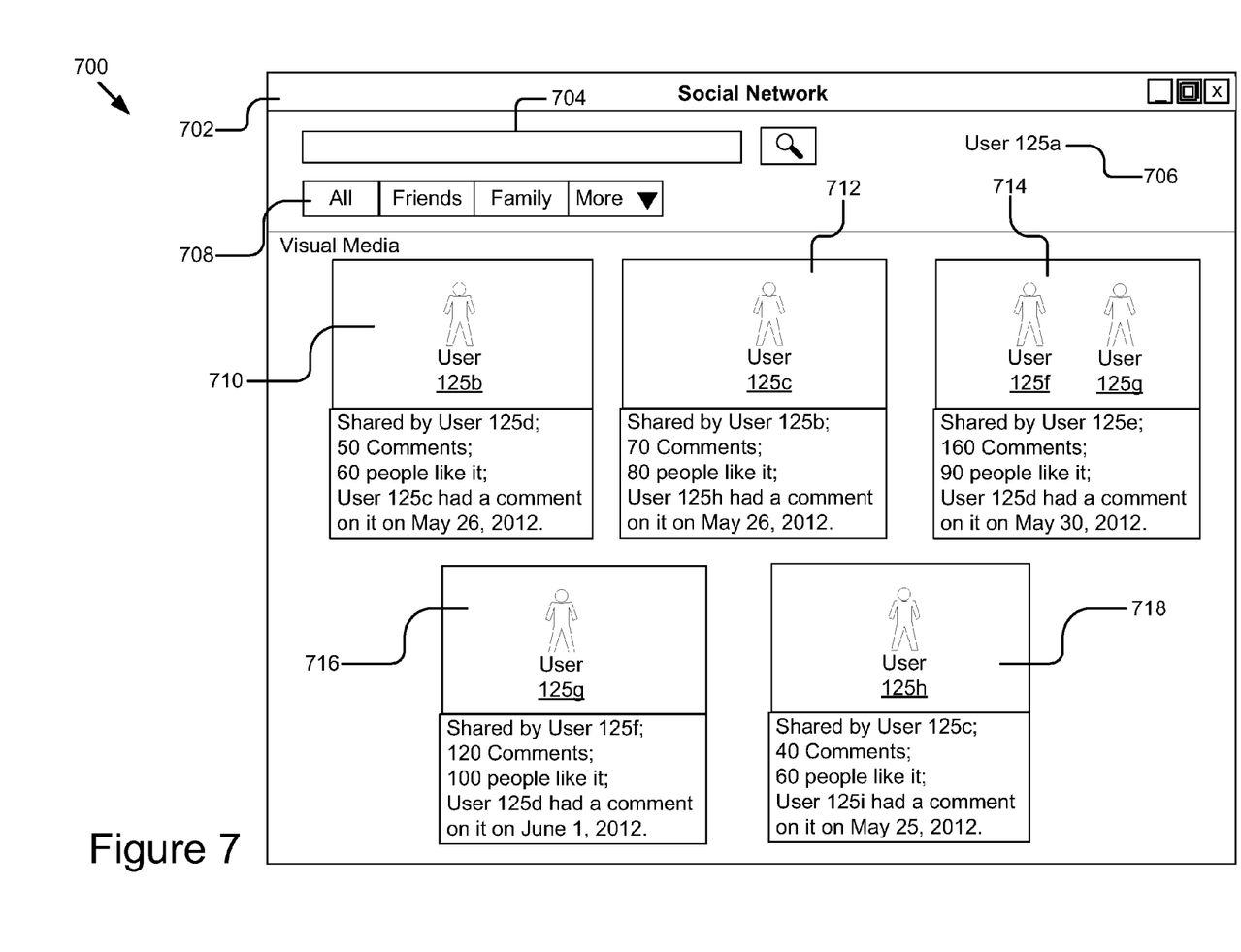
FIG. 7 is a graphical representation illustrating some embodiments of a user interface for presenting a photograph stream to a user in a social network

Referring now to FIG. 7, some embodiments of a social network user interface indicated generally by reference numeral 700 are illustrated. This user interface 700 may be provided for display to any one or more of the user devices 115a through 115n. Reference numeral 702 indicates the social network, for example, the name or any other information that the social network may want displayed to users. The user interface 700 may present control features to enable a particular user of the social network to search for a photograph in his or her photograph stream, by typing a name or key words associated with the photograph in the textbox indicated by reference numeral 704. Reference numeral 706 indicates the name of the current user on the page displayed, in this example, user 125a. The user interface 700 may also provide different options indicated generally by reference numeral 708 for display of photographs to a user. By clicking the tab designated "All," the user interface 700 enables a particular user to request a display of all the photographs in his or her photograph streams or album. By clicking the tab designated "Friends" in the user interface 700, a particular user may only request a display of photographs of his or her friends. By clicking the tab designated "Family" in the user interface 700, a user may request for display, photographs of a particular user's family. The user interface 700 may display photographs in a myriad of other ways when the tab "More" is clicked.

In the illustrated example, the tab designated "All" is highlighted, indicating a particular user's request for all the photographs. With requesting the "All" option, the user interface 700 may display photographs indicated by reference numerals 710-718, based on the user's social graph and other external signals associated with the photographs. In the example illustrated, the user 125b, who is a family member of the user 125a, is tagged in the photograph indicated by reference numeral 710. This photograph is shared by another family member 125d related to user 125a, indicated. In the photograph stream for this particular user, this photograph is provided for display to the user 125a first in a sequence of photographs, as it is likely to be of most interest. The photograph indicated by reference numeral 712 is shared by the family member 125b related to the user 125a and is presented to the user 125a next in sequence, as it is likely to be of interest as well.

As yet another example illustrated, the photograph indicated by reference numeral 714 has the most comments and the photo indicated by reference numeral 716 has the most number of people who endorse it. Therefore, these two photographs are presented to the user 125a subsequently. The photograph indicated by reference numeral 718 has fewer comments and less people who endorse it; therefore, it may be presented to the user 125a last in the sequence of photographs.

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method for providing a stream of one or more of photographs, photographs inter-mixed with videos, and hybrid photographs with animation, for viewing by a particular user connected to other users in a social network, the method comprising:

obtaining, by one or more computing devices, one or more photographs from one or more sources associated with the particular user;

retrieving, by at least one of the one or more computing devices, a social graph associated with the particular user;

determining, by at least one of the one or more computing devices, one or more relevant signals for the one or more photographs, based at least in part on one or more predefined criteria;

assigning, by at least one of the one or more computing devices, varying weights to the one or more relevant signals based at least in part on the predefined criteria including the social graph for the particular user;

ranking, by at least one of the one or more computing devices, the one or more photographs by considering the varying weights assigned to the one or more photographs;

filtering, by at least one of the one or more computing devices, the one or more photographs based on the ranking, to obtain a select subset of one or more photographs of special interest to the particular user;

limiting, by at least one of the one or more computing devices, a number of photographs from a single source in the select subset of the one or more photographs for viewing by the particular user; and providing for display, by at least one of the one or more computing devices, the select subset of the one or more photographs to the particular user for viewing.

2. A computer-implemented method for providing a stream of one or more of photographs, photographs inter-mixed with videos, and hybrid photographs with animation, for viewing by a particular user connected to other users in a social network, the method comprising:

obtaining, by one or more computing devices, one or more photographs from one or more sources for viewing by the particular user;

generating external signals, by at least one of the one or more computing devices, to designate the one or more photographs of interest to the particular user, based at least in part on considering criteria predefined for the particular user;

filtering, by at least one of the one or more computing devices, a select subset of the one or more photographs based at least in part on considering the external signals with respect to the one or more photographs;

limiting, by at least one of the one or more computing devices, a number of photographs from a single source in the select subset of the one or more photographs for viewing by the particular user; and generating, by at least one of the one or more computing devices, a stream of the select subset of the one or more photographs for viewing by the particular user.

3. A computer-implemented method according to claim 2, further comprising:

providing for display, using the one or more computing devices, the select subset of the one or more photographs to the particular user for viewing.

4. A computer-implemented method according to claim 3, wherein the select subset of photographs are provided for viewing by the particular user in a non-regular grid pattern.

5. A computer-implemented method according to claim 2, wherein the criteria that is predefined includes at least one or more of 1) how recently at least one of the one or more photographs was taken, 2) how recently was at least one of the one or more photographs commented on, and 3) how recently was the photograph endorsed.

6. A computer-implemented method according to claim 2, wherein the criteria that is predefined determines at least one or more of 1) the particular user's affinity to one or more of others tagged in the one or more photographs or 2) the particular user's affinity to another user sharing the one or more photographs.

7. A computer-implemented method according to claim 2, wherein the criteria that is predefined determines if there are one or more faces in the one or more photographs.

8. A computer-implemented method according to claim 2, wherein the external signals are assigned weights ranging from high to low, which are considered to filter the select subset of one or more photographs.

9. A computer-implemented method according to claim 2, wherein the predefined criteria determines at least one or more of 1) the location where the photograph was taken, 2) the number of comments made on the one or more photographs, 3) the number of others who have endorsed the one or more photographs, and 4) an aesthetic level of the one or more photographs.

10. A computer-implemented method according to claim 2, wherein the external signals include an interaction history of the particular user viewing the one or more photographs from the single source.

11. A system including one or more computing devices for providing a stream of one or more of photographs, photographs inter-mixed with videos, and hybrid photographs with animation, for viewing by a particular user connected to other users in a social network, the system comprising:

one or more processors;

a memory;

a photograph stream retrieval module stored on the memory and executable by at least one of the one or more processors, the photograph stream retrieval module configured to obtain one or more photographs from one or more sources associated with the particular user;

a social graph retrieval module stored on the memory and executable by at least one of the one or more processors, the social graph retrieval module coupled to the photograph stream retrieval module and configured to retrieve a social graph associated with the particular user;

a relevant photograph signal determination module stored on the memory and executable by at least one of the one or more processors, the relevant photograph signal determination module coupled to the social graph retrieval module and configured to determine one or more relevant signals for each of the one or more photographs from the one or more sources associated with the particular user based at least in part on one or more predefined criteria;

a weight assignment module stored on the memory and executable by at least one of the one or more processors, the weight assignment module coupled to the relevant photograph signal determination module and configured to assign varying weights to the one or more relevant signals based at least in part on the one or more predefined criteria including the social graph for the particular user;

a photograph ranking module stored on the memory and executable by at least one of the one or more processors, the photograph ranking module coupled to the weight assignment module and configured to rank the one or more photographs by considering the varying weights assigned to the one or more photographs;

a photograph filtering module stored on the memory and executable by at least one of the one or more processors, the photograph filtering module coupled to the photograph ranking module and configured to filter photographs with a low rank to generate a select subset of one or more photographs of special interest to the particular user based at least in part on the defined criteria and the social graph;

a photograph limiting module stored on the memory and executable by at least one of the one or more processors, the photograph limiting module coupled to the photograph filtering module and configured to limit a number of photographs from a single source in the select subset of the one or more photographs for viewing by the particular user; and a user interface module stored on the memory and executable by at least one of the one or more processors, the user interface module coupled to the photograph limiting module and configured to provide for display the select subset of the one or more photographs to the particular user for viewing.

12. A system according to claim 11, wherein the system presents the select subset of photographs for viewing by the particular user in a non-regular grid pattern.

13. A system according to claim 11, wherein the predefined criteria includes at least one or more of 1) how recently at least one of the one or more photographs was taken, 2) how recently was at least one of the one or more photographs commented on, and 3) how recently was the photograph endorsed.

14. A system according to claim 11, wherein the predefined criteria determines at least one or more of 1) the particular user's affinity to one or more of others tagged in the one or more photographs or 2) the particular user's affinity to another user sharing the one or more photographs.

15. A system according to claim 11, wherein the predefined criteria determines if there is one or more faces in the one or more photographs.

16. A system according to claim 11, wherein the predefined criteria determines at least one of 1) the location where the photograph was taken, 2) the number of comments made on the one or more photographs, 3) the number of others who have endorsed the one or more photographs, and 4) an aesthetic level of the one or more photographs.

17. A system according to claim 11, wherein the one or more relevant signals include an interaction history of the particular user viewing the one or more photographs from the one or more sources.

18. A system according to claim 11, wherein the photograph ranking module ranks the one or more photographs from high to low.

* * * * *